Sept. 22, 1936. W. L. ADAMS 2,055,447
FISHING REEL
Filed Sept. 28, 1931
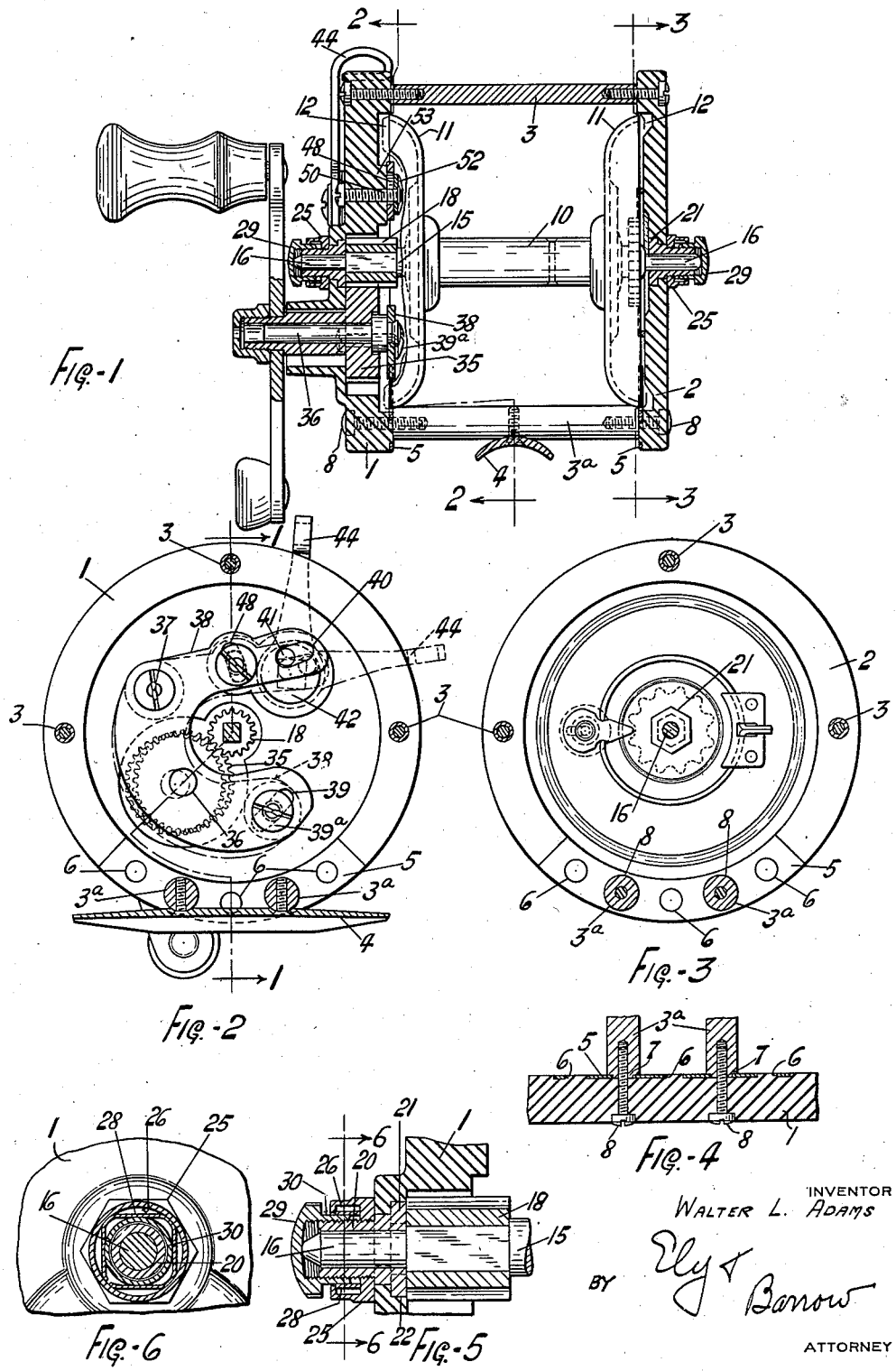
INVENTOR
WALTER L. ADAMS
BY Ely & Barrow
ATTORNEY Patented Sept. 22, 1936

2,055,447

UNITED STATES PATENT OFFICE 2,055,447

FISHING REEL

Walter L. Adams, Akron, Ohio, assignor to The Enterprise Manufacturing Company, Akron, Ohio, a corporation of Ohio Application September 28, 1931, Serial No. 565,506

8 Claims. (Cl. 308—163)

The present invention relates to fishing reels and has for its objects and purposes the improvement of reels similar to existing types in order to strengthen and reinforce the same at points of greatest strain, as will be more fully set forth herein.

It is one of the objects of the invention to improve upon mechanisms employed in reels which may be converted into free spool reels, and particularly to improve upon such reels as shown, for example, in the prior patent to the present inventor No. 1,608,287 of November 23, 1926. Reels of this general form comprise a shiftable plate which supports the crank shaft and pinion, and is movable to bring the pinion into and out of mesh with the pinion upon the spool shaft. When reels are constructed for the purpose of deep sea fishing, the strain and stresses exerted on the spool and to the gearing are very heavy, and with former reels of this construction it was not uncommon for the mechanism to be forced or bent out of operative position by the strains exerted upon the spool. One of the objects of the invention is to improve upon this type of reel and to make it impossible for the gearing to be forced out of its proper operative position.

A further object of the invention is to improve upon the means employed for anchoring the cross plate in the ends of the reel, which are usually of a molded composition, either hard rubber or bakelite. The construction shown and described herein strengthens the reel at the point of attachment between the cross plate and the reel body.

A further object of the invention is to improve upon the mounting of the bushings for the spool shaft.

Another object is to improve upon the end or thrust bearing for the spool shaft and to improve upon the combination tension cup and nut used for the thrust bearing in fishing reels, making the whole assembly easily separable for cleaning or repairs.

There are other objects and advantages as will be understood by those skilled in the art, it being the intention to illustrate the best known form of the invention and not to confine the patent or the claims beyond their fair scope. It is also obvious that changes and modifications may be made in specific embodiments of the invention without departing therefrom.

In the drawing in which the best known or preferred form of the invention is shown:

Figure 1 is a side view of the reel structure, the end plates being shown in section on the line 1—1 of Figure 2;

Figure 2 is a section on the line 2—2 of Figure 1;

Figure 3 is a section on the line 3—3 of Figure 1, showing the anchorage for the cross plate;

Figure 4 is a sectional view along the cross plate anchorage;

Figure 5 is an enlarged detail of the shaft bearing; and

Figure 6 is a section on the line 6—6 of Figure 5.

The reel structure is composed of the front plate 1 and the rear plate 2, each of which is composed of a suitable molded composition, such as hard rubber, bakelite or the like. The plates are connected by the usual pillars 3, two of which designated as 3ª, are somewhat heavier for attachment of the cross plate 4 by which the reel is mounted on the rod. Where large game fish are to be landed, the form of reel heretofore used, with the standard anchorage for the cross plate, has failed frequently at the point where the pillars are received in the end plates.

For the purpose of remedying this defect, the invention proposes to set in the flanges on the end plates a pair of arc-shaped metal plates 5 each of which extends around a substantial area of the end plate. These plates are set within recesses formed in the end plates when they are molded and are provided with a plurality of spaced openings 6 into which the molded material will be received so as to anchor the plate 5 on the end plate. The ends of the pillars 3ª are reduced, as shown in Figure 4, and each end received in a socket 7 in the end plate, the holding screws 8 passing into the pillars at the center thereof. It will be seen that the construction described gives a very substantial anchorage for the pillars and thus enables them to withstand excessive strains without breaking the composition end plates.

The spool is indicated at 10, being provided with flanges 11 which run in grooves 12 formed in the end plates. The spool is mounted upon the shaft 15 which is reduced at the ends, as shown at 16. At the end of the shaft near the front plate, the spool pinion 18 is mounted.

The mounting for the spool shaft is the same at both ends and attention is directed to Figures 5 and 6 which show this in detail. The bushing is indicated at 20 and is provided at its inner end with an enlarged head 21, preferably hexagonal in form, which is seated within a similarly shaped socket 22 formed on the end plate. The hexagonal formation of the bushing head prevents rotation of the bushing in the end plate more effectively than the usual flattened head heretofore employed. The outer end of the bushing is screw-threaded and receives the nut 25. On the nut 25 is located the cup or circular seat 26 in which is seated the flattened spring ring 28. Threaded over the outer end of the bushing is the thrust bearing or cap 29, the sleeve 30 of which is received within the tension cup so that the spring ring 28 bears against the sleeve at its flattened points and against the interior surface of the cup at its corners. The tension thus exerted maintains the cap in position. The end of the shaft bears against the inner surface of the cap 29, as shown. By making the tension cup as shown, it is readily removable for oiling and repair, this construction making more compact and simplifying the reel assembly and the reel repair and upkeep. It also permits the ready removal of the bushing, a result not heretofore obtained in reel mountings of this general type, such, for example, as shown in the Case Patent No. 1,450,738 of April 3, 1923.

In order to drive the reel, a pinion 35 is secured to the reel crank shaft 36, meshing with the pinion 18 when in driving relation. To make the reel adjustable for free-spool operation, the shaft 36 is mounted in a shiftable bridge 38 which is angular or substantially U-shaped, as shown in Figure 2, being pivoted as at 37 to a post secured in the front plate 1. The bridge is so shaped and proportioned that when in the full line position shown in Figure 2, the gears 18 and 35 are in mesh. When moved to the dotted line position, the gears are out of mesh and the spool is free to turn upon its axis. The end plate is recessed to permit shifting of the crank shaft and gear.

One end or arm of the lever which constitutes the bridge is slotted as at 39 and received over a headed pin 39ª. The opposite end is provided with a slot 40 in which is located a pin 41 eccentrically located upon a rotatable post 42 which is mounted in the end plate and shifted by a lever 44. This is the construction shown in the prior Adams patent.

It has been found that excessive loads and strains to which these salt water reels are subjected cause them to bend and become displaced. I propose, therefore, to provide the arm of the lever near the operating point with a slot 48 and to receive therein a pin 50 mounted in the end plate. The end of the pin is provided with a cap 52 peened in place and bearing upon the lever or bridge. The end plate is formed with a boss 53 bearing against the under side of the bridge. This construction will hold the bridge in place and will prevent the objectionable results referred to, as the bridge is confined by the headed screws or pins upon opposite sides of the pivot point of the bridge.

Except as herein referred to, the reel structure is of standard or usual form and will not be further described. It is also possible to change the form or details of the features of improvement without in any way departing from the essentials of the invention as described and claimed herein.

What is claimed is:

1. A reel structure having an end plate, a spool and a spool shaft therefor, a bushing for the shaft having a head seated in a socket in the end plate, a cup removably mounted on the bushing beyond the end plate, a thrust bearing removably mounted on the end of the bushing and having a sleeve to enter the cup, and a spring tension member in the cup cooperating with the sleeve.

2. In a reel structure an end plate having a socket therein, a bushing having a head seated in the socket and projecting through the end plate, the outer end of the bushing being screw-threaded, a tension cup screwed upon the extension of the bushing, and a cap also screwed upon the end of the bushing and entering the cup.

3. In a reel structure, an end plate, a headed bushing extending through the end plate and removable therefrom in one direction, and a tension cup and thrust bearing secured to the bushing and retaining the bushing in the end plate, said cup and thrust bearing being removable to permit the removal of the bushing.

4. In a reel structure, a bushing, a cup removably mounted on the bushing, tension means within the cup, and a thrust bearing also removably mounted on the bushing and entering the cup, said cup and thrust bearing being removable from the same end of the bushing.

5. In a reel structure, an end plate, a bushing having a reduced screw-threaded end extending through the end plate, an integral nut and tension device screwed upon the bushing and retaining the latter in the end plate, and a thrust bearing also screwed upon the same end of the bushing, and engaging said tension device.

6. In a reel structure, an end plate, a bushing having a reduced screw-threaded end extending through the end plate, a nut screwed upon the bushing against the end plate, a thrust bearing also screwed upon the end of the bushing, a cup located on the nut, and a spring located in the cup contacting the thrust bearing.

7. A structure as set forth in claim 5 in which the head of the bushing is substantially hexagonal, and the end plate is provided with a socket to receive the head of the bushing.

8. In a fishing reel structure, an end plate, a bushing for the spool shaft removably mounted in the end plate and formed with an enlarged flange disposed on one side of said end plate, a thrust bearing for the spool shaft at the outer end of the bushing, a spring element surrounding the bearing, and a nut to hold the bushing in place, said bearing, spring element, and nut being disposed on the opposite side of said end plate from said flange.

WALTER L. ADAMS.